(12) United States Patent
Piret et al.

(10) Patent No.: US 7,129,289 B2
(45) Date of Patent: Oct. 31, 2006

(54) HYDROLIZATION RESISTANT SIZING COMPOSITION

(75) Inventors: Willy H. Piret, Xhendelesse (BE); Nadia Masson, Olne (BE)

(73) Assignee: Owens Corning Composites S.P.R.L., Brussels (BE)

( * ) Notice: Subject to any disclaimer, the term of this patent is extended or adjusted under 35 U.S.C. 154(b) by 349 days.

(21) Appl. No.: 10/804,623

(22) Filed: Mar. 19, 2004

(65) Prior Publication Data

US 2004/0209991 A1 Oct. 21, 2004

Related U.S. Application Data

(63) Continuation of application No. 10/326,006, filed on Dec. 19, 2002.

(60) Provisional application No. 60/342,868, filed on Dec. 21, 2001.

(51) Int. Cl.
*C08L 9/00* (2006.01)
*C08F 220/12* (2006.01)
*D02G 3/18* (2006.01)
*C03C 25/48* (2006.01)
*C03C 25/28* (2006.01)

(52) U.S. Cl. ............... 524/571; 524/562; 524/556; 428/388; 428/380; 428/383; 428/378; 65/443; 65/444; 65/447; 65/448

(58) Field of Classification Search ............. 428/378, 428/383, 380, 388; 524/562, 571, 572; 65/444, 65/443
See application file for complete search history.

(56) References Cited

U.S. PATENT DOCUMENTS

| | | | |
|---|---|---|---|
| 3,414,432 A | 12/1968 | Mertzweiller et al. | |
| 3,816,235 A * | 6/1974 | Lin | 524/188 |
| 4,609,591 A * | 9/1986 | Pollet et al. | 428/391 |
| 5,324,755 A * | 6/1994 | Kilius et al. | 523/214 |
| 5,578,535 A | 11/1996 | Hill et al. | |
| 5,693,378 A | 12/1997 | Hill et al. | |
| 5,811,480 A * | 9/1998 | Kirchmeyer et al. | 524/287 |
| 5,868,982 A | 2/1999 | Strait et al. | |
| 5,945,134 A * | 8/1999 | Strait et al. | 425/222 |
| 5,972,503 A * | 10/1999 | Woodside | 428/378 |
| 6,365,090 B1 | 4/2002 | Strait et al. | |
| 6,365,272 B1 | 4/2002 | Masson et al. | |
| 6,407,157 B1 | 6/2002 | Oyamada et al. | |
| 6,659,756 B1 | 12/2003 | Strait et al. | |
| 2003/0176565 A1 | 9/2003 | Piret et al. | |

FOREIGN PATENT DOCUMENTS

| | | | |
|---|---|---|---|
| JP | 60-44535 A | * | 3/1985 |
| JP | 60044535 | | 3/1985 |
| JP | 3-80135 A | * | 4/1991 |
| JP | 2003201671 | | 7/2003 |

OTHER PUBLICATIONS

JP 3-80135 Abstract in English.*

* cited by examiner

*Primary Examiner*—David W. Wu
*Assistant Examiner*—Rip A. Lee
(74) *Attorney, Agent, or Firm*—Inger H. Eckert; Margaret S. Millikin

(57) ABSTRACT

A two-part sizing composition that imparts improved resistance to hydrolysis of reinforced composites including a size composition and a binder composition is provided. The size composition may include one or more coupling agents, one or more lubricants, and at least one wetting agent. The binder composition may include a copolymer formed from maleic anhydride and at least one other copolymerizable monomer, at least one crosslinking agent, and a surfactant or mixture of surfactants. In at least one exemplary embodiment, the maleic anhydride copolymer is a maleic anhydride-butadiene copolymer partial ammonium salt. The size composition may be applied to a reinforcing fiber material before the binder size material is applied. The two-part size composition may be applied to a reinforcing fiber material to form a reinforcing fiber product which may then be densified or compacted to form a densified reinforcing fiber product, such as a pellet.

20 Claims, No Drawings

HYDROLIZATION RESISTANT SIZING COMPOSITION

CROSS REFERENCE TO RELATED APPLICATIONS

This application is a continuation of U.S. patent application Ser. No. 10/326,006 filed on Dec. 19, 2002, which claims priority to U.S. Provisional Application Ser. No. 60/342,868 filed on Dec. 21, 2001, the contents of each are incorporated by reference in their entireties.

TECHNICAL FIELD AND INDUSTRIAL APPLICABILITY OF THE INVENTION

The present invention relates generally to a sizing composition for a reinforcing fiber material, and more particularly, to a two-part sizing composition that imparts improved hydrolysis resistance to reinforced composites which includes a size composition and a binder composition. A composite article formed from a reinforcing fiber material sized with a two-part sizing composition is also provided.

BACKGROUND OF THE INVENTION

Glass fibers are useful in a variety of technologies. For example, glass fibers are commonly used as reinforcements in polymer matrices to form glass fiber reinforced plastics or composites. Glass fibers have been used in the form of continuous or chopped filaments, strands, rovings, woven fabrics, nonwoven fabrics, meshes, and scrims to reinforce polymers. It is known in the art that glass fiber reinforced polymer composites possess higher mechanical properties compared to unreinforced polymer composites, provided that the reinforcement fiber surface is suitably modified by a sizing composition. Thus, better dimensional stability, tensile strength and modulus, flexural strength and modulus, impact resistance, and creep resistance may be achieved with glass fiber reinforced composites.

Chopped glass fibers are commonly used as reinforcement materials in reinforced composites. Conventionally, glass fibers are formed by attenuating streams of a molten glass material from a bushing or orifice. The glass fibers may be attenuated by a winder which collects gathered filaments into a package or by rollers which pull the fibers before they are collected and chopped. An aqueous sizing composition, or chemical treatment, is typically applied to the fibers after they are drawn from the bushing. After the fibers are treated with the aqueous sizing composition, they may be dried in a package or chopped strand form.

Chopped strand segments may be mixed with a polymeric resin and supplied to a compression- or injection-molding machine to be formed into glass fiber reinforced composites. Typically, the chopped strand segments are mixed with pellets of a thermoplastic polymer resin in an extruder. In one conventional method, polymer pellets are fed into a first port of a twin screw extruder and the chopped glass fibers are fed into a second port of the extruder with the melted polymer to form a fiber/resin mixture. Alternatively, the polymer pellets and chopped strand segments are dry mixed and fed together into a single screw extruder where the resin is melted, the integrity of the glass fiber strands is destroyed, and the fiber strands are dispersed throughout the molten resin to form a fiber/resin mixture. Next, the fiber/resin mixture is degassed and formed into pellets. The dry fiber strand/resin dispersion pellets are then fed to a molding machine and formed into molded composite articles that have a substantially homogeneous dispersion of glass fiber strands throughout the composite article.

Unfortunately, chopped glass fibers are often bulky and do not flow well in automated equipment. As a result, the chopped fiber strands may be compacted into rod-shaped bundles or pellets to improve their flowability and to enable the use of automated equipment, such as, for example, for transporting the pellets and mixing the pellets with the polymer resins. U.S. Pat. No. 5,578,535 to Hill et al. discloses glass fiber pellets that are from about 20 to 30% denser than the individual glass strands from which they are made, and approximately 5 to 15 times larger in diameter. These pellets are prepared by hydrating cut fiber strand segments to a hydration level sufficient to prevent separation of the fiber strand segments into individual filaments but insufficient to cause the fiber strand segments to agglomerate into a clump. The hydrated strand segments are then mixed for a period of time sufficient for the strand segments to form pellets. Suitable mixing methods include processes that keep the fibers moving over and around one another, such as by tumbling, agitating, blending, commingling, stirring and/or intermingling the fibers.

Sizing compositions, such as are used in reinforced composites, are well-known in the art and conventionally include a film forming polymeric or resinous component, a coupling agent, and a lubricant. A sizing composition is typically added to glass fibers to reduce interfilament abrasion and to make the glass fibers compatible with the polymeric matrices they are intended to reinforce. The sizing composition also ensures the integrity of the strands of glass fibers, e.g., the interconnection of the glass filaments that form the strand.

One fundamental problem associated with conventional sizing compositions used in reinforced composites is the aging of the polymer matrix composite under the action of hydrolysis, which results in a decrease in mechanical strength. For example, hydrolysis of polyamide composites reduces tensile strength, elongation at break, and Charpy un-notched impact strength. Hydrolysis is a particular problem in areas where there is a significant amount of water present, such as in water end caps of radiators for automobiles. Thus, there exists a need in the art for a sizing composition that confers improved hydrolysis resistance to glass reinforced composites under extreme hydrolysis conditions.

SUMMARY OF THE INVENTION

It is an object of the present invention to provide a two-part sizing composition that imparts improved hydrolysis resistance to reinforced composites. The two-part sizing composition includes a size composition and a binder composition. The size composition may be applied to a reinforcing fiber material before the binder composition is applied. The reinforcing fiber material may be one or more strands of glass (e.g., Advantex® glass), natural fibers, carbon fibers, or one or more synthetic polymers. According to at least one exemplary embodiment of the present invention, the size composition includes one or more coupling agents, one or more lubricants, and at least one wetting agent. Preferably, the coupling agent is an aminosilane or a diaminosilane. In addition, the size composition may optionally include conventional additives such as pH adjusters, antioxidants, antifoaming agents, processing aids, antistatic agents, and/or non-ionic surfactants.

The binder composition includes a copolymer of maleic anhydride and at least one other co-polymerizable monomer.

The maleic anhydride copolymer may be a pure copolymer or derivatives in the anhydride, acid, salt, hemi-ester, or amide form. In addition, the copolymer may be formed from the polymerization of the maleic anhydride or acid with at least one co-monomer. Suitable copolymers include $C_2$–$C_5$ α-olefins, such as butadiene-, ethylene-, propylene- or (iso) butylene-maleic acid copolymers, methyl vinyl ether-maleic acid copolymers, and ethylene-ethylacrylate-maleic anhydride copolymers. In preferred embodiments, the maleic anhydride copolymer is a maleic anhydride-butadiene copolymer or a maleic anhydride-butadiene copolymer partial ammonium salt sold under the tradename Maldene 286 by Lindau Chemicals, Inc. The binder composition may also include a film forming agent, a crosslinking agent, and a surfactant or a mixture of surfactants. Other conventional additives such as lubricants and anti-static agents may be included in the binder composition.

It is another object of the present invention to provide a reinforcing fiber product that includes one or more strands of a reinforcing fiber material coated first with a size composition and then with a binder composition as described above. The reinforcing fiber product may be a densified fiber product in the form of a pellet. The reinforcing fiber product coated with the two-part sizing composition may be used to form a composite product that demonstrates improved physical properties, such as improved strength under extreme hydrolysis conditions. Because of its high resistance to hydrolysis, the two-part sizing composition may be used to form reinforced composite products for use in applications where high resistance to hydrolysis is needed, such as in an automobile radiator where wet strength of the composite is desirable at elevated temperature and pressure conditions.

It is yet another object of the present invention to provide a process for making a densified reinforcing fiber product. The process for making a densified reinforcing fiber product may be an in-line process that includes applying a sizing composition as described above to a strand of a reinforcing fiber material, chopping the strand of sized reinforcing fibers into segments, applying a binder composition as described above to the segments, and pelletizing and/or densifying the segments to form the densified reinforcing fiber product. Pellet formation and densification may occur in separate tumbling apparatuses, such as in a rotary drum (e.g., pelletizer) and rotating zig-zag tube (e.g., densifier). Alternatively, pellet formation and densification may occur in separate regions within a single apparatus, such as in a "Zig-Zag" blender commercially available from Patterson Kelly. The size composition may be applied to the fibers as they are being formed and the binder composition may be applied to the sized fibers in a pelletizer. By applying the binder composition in the pelletizer, an application efficiency of approximately 95–100% for the binder composition may be obtained. In addition, applying the binder composition separately from the sizing composition outside the fiber-forming environment permits the inclusion of materials that are not desirably applied during the fiber-forming process because of safety, flammability, irritation, stability, low compatibility with aminosilanes, viscosity, toxicity, cleanliness, odor, cost, and/or shear sensitivity.

It is an advantage of the two-part sizing composition that by applying the size composition to a reinforcing fiber material prior to the binder composition, a layer of silane is applied directly and substantially evenly to the reinforcing fiber material prior to the application of a film forming agent. Due to the interaction of the silane with the surface of the reinforcing fiber material, optimal physical properties of the composite product formed from the sized reinforced fiber materials may be achieved. In addition, the presence of silane on the reinforcing fiber material may reduce subsequent chemical corrosion and interfilament abrasion of the fiber material.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

The present invention relates to a two-part sizing composition that improves the hydrolysis resistance of reinforced composites. The two-part sizing composition includes a size composition and a binder composition. The two-part sizing composition may be applied to a reinforcing fiber material to form a reinforcing fiber product which may then be densified or compacted to form a densified reinforcing fiber product, such as pellets. The densified pellets provide a convenient form for storage and handling of the chopped fibers used as reinforcing materials in composite structures.

The size composition may be applied to a reinforcing fiber material before the binder size material is applied. The reinforcing fiber material may be one or more strands of glass formed by conventional techniques such as by drawing molten glass through a heated bushing to form substantially continuous glass fibers. These fibers may subsequently be collected into a glass strand. Any type of glass, such as A-type glass, C-type glass, E-type glass, S-type glass, or modifications thereof, is suitable for use as the reinforcing fiber material. For example, in one modification of E-type glass, the boron oxide is replaced by magnesium oxide. Such a glass is commercially available from Owens Corning Fiberglass Corporation under the trade name Advantex. Preferably, the reinforcing fiber material is E-type glass or Advantex® glass.

Alternatively, the reinforcing fiber material may be strands of one or more synthetic polymers such as polyester, polyamide, aramid, and mixtures thereof. The polymer strands may be used alone as the reinforcing fiber material, or they can be used in combination with glass strands such as those described above. As a further alternative, natural fibers may be used as the reinforcing fiber material. The term "natural fiber" as used in conjunction with the present invention refers to plant fibers extracted from any part of a plant, including the stem, seeds, leaves, roots or bast. Examples of natural fibers suitable for use as the reinforcing fiber material include cotton, jute, bamboo, ramie, bagasse, hemp, coir, linen, kenaf, sisal, flax, henequen, and combinations thereof. Carbon or polyaramide fibers may be also used as the reinforcing fiber material.

The reinforcing fiber material may include fibers that have a diameter of from about 6 microns to about 24 microns and may be cut into segments approximately 1 mm to about 50 mm in length. Preferably, the fibers have a diameter of from about 7 microns to about 14 microns and a length of from about 3 mm to about 6 mm. Most preferably, the fibers have a diameter of approximately 10 microns. Prior to the densification of the reinforcing fiber material as described below, each strand may contain from approximately 500 fibers to approximately 8,000 fibers.

After the reinforcing fibers are formed, and prior to their collection into a strand, they may be coated with a size composition. A suitable size composition according to at least one exemplary embodiment of the present invention includes one or more coupling agents, one or more lubricants, at least one wetting agent, and optionally, conventional additives such as, but not limited to, pH adjusters, antioxidants, antifoaming agents, processing aids, antistatic agents, and non-ionic surfactants. The size composition may be applied to the fibers with a Loss on Ignition (LOI) of less than 0.1% on the dried fiber. LOI may be defined as the percentage of organic solid matter deposited on the glass fiber surfaces.

The size composition includes one or more coupling agents. Preferably, the coupling agent is a silane coupling agent. Silane coupling agents function to enhance the adhesion of the film forming copolymer to the glass fibers and to reduce the level of fuzz, or broken fiber filaments, during subsequent processing. Examples of silane coupling agents which may be used in the present size composition may be characterized by the functional groups amino, epoxy, vinyl, methacryloxy, ureido, isocyanato, and azamido. In preferred embodiments, the silane coupling agents include silanes containing one or more nitrogen atoms that have one or more functional groups such as amine (primary, secondary, tertiary, and quarternary), amino, imino, amido, imido, ureido, isocyanato, or azamido.

Suitable coupling agents for use in the size composition are available commercially, such as, for example, from GE Silicones—Osi Specialties, Dow Corning Inc., and Chisso. Examples of suitable silane coupling agents include, but are not limited to, γ-aminopropyltriethoxysilane, commercially available under the trade name A-1110 (GE Silicones—Osi Specialties), n-trimethoxy-silyl-propyl-ethylene-diamine, commercially available under the trade name A-1120 (GE Silicones—Osi Specialties), polyazamide silylated aminosilane, commercially available under the trade name A-1387 (GE Silicones-Osi Specialties), a γ-ureidopropyltrimethoxysilane, commercially available under the tradename A-1524 (GE Silicones—Osi Specialties), an aminosilane coupling agent including a mixture of approximately 24% by weight diaminosilane modified by a surfactant in a methanol solution, available under the tradename A-1126 (GE Silicones—Osi Specialties), and Silquest® A-Link™ 15 Silane, an n-ethyl-amino isobutyl trimethoxy silane available from Witco. Other commercially available silane coupling agents include, but are not limited to, products from GE Silicones—Osi Specialties having the trade designations set forth in Table 1.

TABLE 1

| A-154 | methyl-trichlorosilane |
| A-163 | methyl-trimethoxysilane |
| A-189 | γ-mercaptopropyl-trimethoxy-silane |
| A-1289 | bis-(3-[triethoxysilyl]propyl)tetrasulfane |
| A-143 | γ-chloropropyl-trimethoxy-silane |
| A-151 | vinyl-triethoxy-silane |
| A-172 | vinyl-tris-(2-methoxyethoxy)silane |

TABLE 1-continued

| A-2171 | vinylmethyldimethoxysilane |
| A-188 | vinyl-triacetoxy silane |
| A-174 | γ-(methacryloxy)propyl-triethoxy-silane |
| A-187 | γ-glycidoxy-propyl-trimethoxy-silane |
| A-137 | octyltriethoxysilane |
| A-162 | methyltriethoxysilane |
| A-1630 | methyltrimethoxysilane |
| Y-11597 | tris-[3-(trimethoxysilyl)propyl]isocyanurate |
| A-1106 | aminoalkyl silicone solution |
| Y-9669 | n-phenyl-γ-aminopropyltrimethoxysilane |
| Y-11343 | organomodified polydimethylsiloxane |
| A-1387 | polyazamide silane (50% in methanol) |
| A-1310 | γ-isocyanatopropyltriethoxysilane |
| Y-11639 | 4-amino-3,3-dimethylbutyldimethoxymethylsilane |
| Y-11777 | amino alkyl silicone/water solution |
| Y-5997 | ethoxy/methoxy ester solution |
| Y-11637 | aminoneohexyltriethoxysilane |

Additional examples of suitable silane coupling agents include the products from Chisso having the trade designations set forth in Table 2.

TABLE 2

| S-310 | n-(2-aminoethyl)-3-aminopropylmethyldimethoxysilane |
| S-320 | n-(2-aminoethyl)-3-aminopropyltrimethoxysilane |
| S-350 | n-[2-(vinylbenzylamino)ethyl]-3-aminopropyl-trimethoxysilane monohydrochloride (methanol solution) |
| S-510 | 3-glycidoxypropyltrimethoxysilane |
| S-610 | 3-chloropropylmethydimethoxysilane |
| S-620 | 3-chloropropyltrimethoxysilane |

Preferably, the silane coupling agent is an aminosilane or a diaminosilane.

The silane coupling agents used in the present invention may be replaced by alternative coupling agents or mixtures. For example, A-1387 may be replaced by a version in which the methanol solvent is replaced by ethanol. A-1126 may be replaced with trimethoxy-silyl-propyl-ethylene-diamine (Z-6020 from Dow Corning). A-1120 or Z-6020 may be substituted by a pre-hydrolyzed version. Z-6020 may be replaced by Z-6137, a pre-hydrolyzed version lacking the alcohol solvent and including 33% diaminosilane in water at a concentration of 24% solids (commercially available from Dow Corning).

The size composition may include one or more of the above-identified coupling agents. Preferably, the coupling agent is present in the size composition in an amount of from 25–100% by weight of the active solids in the size composition, and even more preferably, in an amount of from 50–100% by weight of the active solids.

In addition, the size composition may include at least one lubricant to facilitate manufacturing. The lubricant may be present in an amount of from 0–50% by weight of the active solids in the size composition. Preferably, the lubricant is present in an amount of from 5–50% by weight of the active solids. Any suitable lubricant may be used. Lubricants suitable for use in the size composition include, but are not limited to, water-soluble ethyleneglycol stearates (e.g., polyethyleneglycol monostearate, butoxyethyl stearate, polyethylene glycol monooleate, and butoxyethylstearate), ethyleneglycol oleates, ethoxylated fatty amines, glycerine, emulsified mineral oils, and organopolysiloxane emulsions. Other examples of lubricants include alkyl imidazoline derivatives (e.g., cationic softener Conc. Flakes, which has a solids content of approximately 90% and is available commercially from Th. Goldschmidt AG), stearic ethanolamide, sold under the trade designation Lubesize K-12 (Alpha/Owens Corning), and a polyethyleneimine polyamide salt commercially available at 50% active solid from Cognis under the trade name Emery 6760.

Further, the size composition may include at least one a wetting agent. Wetting agents function as agents capable of reducing the surface tension of the size composition to facilitate the wetting of the reinforcing fiber material. In addition, wetting agents facilitate contact between the size composition and the fiber surface. Any conventional wetting agent that is compatible with the other ingredients of the size composition may be used. In a preferred embodiment, the wetting agent is a fluoroalkyl alcohol substituted polyethylene glycol sold under the trade name of Zonyl FS-300 by Dupont. Other suitable wetting agents include non-ionic surfactant wetting agents based on propylene oxide-ethylene oxide block copolymers. A particularly suitable wetting agent is a block copolymer trifunctional polypropylene oxide-polyethylene oxide terminated by secondary hydroxy groups which is commercially available under the trade name Pluronic 10R5 from BASF. The wetting agent may be present in an amount of from 0–50% by weight of the active solids in the size composition.

Although the size composition is effective at any pH level, the pH preferably falls within the range of from 7 to 10. The pH may be adjusted depending on the intended application, or to facilitate the compatibility of the ingredients of the size composition. Any suitable pH adjuster (e.g., a weak organic acid such as acetic acid or a base such as ammonia), may be added to the size composition in an amount sufficient to adjust the pH to a desired level.

The size composition may be made by dissolving each of the ingredients into a premix with agitation. The separate premixes may then be combined with deionized water to form a main mixture and to achieve the appropriate concentration and control the mix of solids. The premixes may be added in any order. If necessary, the pH of the main mixture may be adjusted to a desired level. The premixes may be added separately, or they may be added at the same time to form the main mixture.

A size composition according to an exemplary embodiment of the present invention is set forth in Table 3.

TABLE 3

| Component of Size Composition | % by Weight of Active Solids |
|---|---|
| Silquest A-1100[a] | 91 |
| Lubesize K-12[b] | 6 |
| Zonyl FS-300[c] | 2 |

[a]aminopropyltriethoxysilane (GE Silicone OSI)
[b]tetraethylene pentamine r. with stearic acid (AOC)
[c]fluoroalkyl alcohol substituted polyethylene glycol (Dupont)

As described above, the two-part sizing composition also includes a binder composition. The binder composition includes a copolymer of maleic anhydride and at least one other copolymerizable monomer. In addition, the binder composition may include any suitable additive identified by one of skill in the art, such as, for example, adhesive film forming polymers, lubricants, a surfactant or a mixture of surfactants, antistatic agents, and crosslinking agents. The binder composition may be applied to the fiber with an LOI of from 0.2–2.0%, depending on the desired application. The total LOI for the size composition and the binder composition on the reinforcing fiber material is preferably from approximately 0.3–2.1%.

The term "maleic anhydride copolymer" includes the pure copolymer as well as derivatives in the anhydride, acid, salt (e.g., (partial) ammonium salt), hemi-ester, or amide form. The copolymer may be formed from the polymerization of the maleic anhydride or acid with at least one co-monomer. The copolymer may also include terpolymers that have at least one maleic anhydride residue. Such a copolymer may include $C_2$–$C_5$ α-olefins, such as butadiene-, ethylene-, propylene- or (iso)butylene-maleic acid copolymers, methyl vinyl ether-maleic acid copolymers, and ethylene-ethylacrylate-maleic anhydride copolymers (E-EA-MAH sold under the trade designation M109D, M220E, and M410V by Sumitomo Seika). The maleic anhydride copolymer that is formed is generally in the form of a white or colorless powder. In at least one exemplary embodiment, the copolymer is an aqueous solution of the polyacid, (partial) ammonium salt, half-ester or half-amide derivative of an alternating block copolymer of maleic anhydride, or mixtures thereof. Mixtures of different maleic anhydride copolymers such as those described above may used in the binder composition to achieve desired properties, such as reduced discoloration in the reinforced fiber product or improved strand integrity. The maleic anhydride copolymer(s) may be present in an amount of from 10–100% by weight of the active solids in the binder composition.

The maleic anhydride copolymer is useful for making a clear, transparent, substantially colorless product when used in the binder composition. The copolymer is poorly soluble when dispersed in water at room temperature, but when heated to temperatures above 90° C., it dissolves by virtue of the hydrolysis of the anhydride groups of the polymer to form the corresponding polyacids. In such a reaction, one mole of anhydride is hydrolyzed to two moles of diacid in an exothermic reaction. The aqueous solution formed by the hydrolysis may then be used to formulate the binder composition. Similar reactions may be employed using ammonia or an amine in water, or an alcohol or an amine in a non-reactive solvent, to form, respectively, solutions of the (partial) ammonium salt, half-ester or half-amide derivatives.

In at least one preferred embodiment, the maleic anhydride copolymer is a maleic anhydride-butadiene copolymer. In at least one other preferred embodiment, the maleic anhydride copolymer is a maleic anhydride-butadiene copolymer partial ammonium salt, e.g., a compound having a polybutadiene polymer backbone with pendant polyfunctional groups, each of which contains one or more ammonium salt groups, sold under the tradename Maldene 286 by Lindau Chemicals, Inc.

In addition to a maleic anhydride copolymer, the binder composition may also include one or more film forming agents. Film formers are agents which create improved adhesion between the reinforcing fibers, which results in improved strand integrity. Suitable film formers include thermosetting and thermoplastic polymers which promote the adhesion of sizing compositions. Examples of suitable film formers for use in the binder composition include, but are not limited to, Baybond® PU-330, Baybond® PU-400-S, Baybond® PU-401, Baybond® VP-LS-2277, and Baybond® VP-LS-2297 (anionic/non-ionic polyester based urethane polymer dispersions available from Bayer Corp); Baybond® PU-130 (an anionic/non-ionic polyether based urethane polymer dispersion available from Bayer Corp); Baybond® PU-403 (a polyester polyol based aliphatic isocyanate polyurethane dispersion available from Bayer Corp); Baybond® XP-2435 (an anionic/non-ionic polyether based urethane polymer dispersion available from Bayer Corp); and Baybond® PU-239 (a crosslinkable anionic/non-ionic polyester urethane polymer dispersion based on aliphatic isocyanates available from Bayer Corp).

Other suitable examples of film forming agents include a polyurethane emulsion commercially available as Impranil DLS™ (Bayer Corp.), Aquathane 518NE, a polyester polyol based aliphatic isocyanate polyurethane dispersion (commercially available from D.I.C. Inc.), RSC 1187, an anionic/non-ionic polycarbonate/polyether polyurethane based on Desmodur H/IPDI (available from Bayer Corp.), and Witcobond 176-75X, a slightly anionic aqueous polyurethane/isocyanate dispersion of a high molecular weight (molecular weight of approximately 100,000) branched polyurethane polymer based on polyester polyol and 1,1-methylenebis-(isocyanatoxycyclohexane) where some of the polymer chains are terminated with blocked isocyanate groups (commercially available from Baxenden Chemicals Limited (UK) and Witco). The film former may be present from approximately 0–80% by weight of the active solids in the binder composition, preferably from about 10–80% by weight of the active solids. Preferably, an amount of film former is used such that the binder size provides the desired adhesion without developing static and/or an undesirable color in the reinforcing fiber product.

Additionally, the binder composition may include one or more crosslinking agents to promote the binding of the binder composition to the surface of the reinforcing fiber material. Any suitable crosslinking agent may be used in the binder composition. For example, crosslinking agents such as organofunctional silanes (e.g., A-1100 and A-1120 available from GE silicones—Osi Specialties), polyacids, polyamines, and polyfunctional blocked isocyanates are suitable crosslinking agents. The crosslinking agent may be present in an amount of from 0–20% by weight of the active solids in the binder composition, preferably in an amount of from 5–20% by weight of the active solids, and even more preferably in an amount of from 7–15% by weight of the active solids. In at least one preferred embodiment, the crosslinking agent is Silquest A-1100, an aminopropyltriethoxysilane available from GE Silicones—Osi Specialties.

In addition, a surfactant or surfactant mixture may be added to the binder composition. Any suitable surfactant or mixture of surfactants may be added. Examples of suitable surfactants for use in the instant binder composition include, but are not limited to, non-ionic surfactants, such as Triton X-100, an octylphenoxypolyethoxyethanol (available commercially from Union Carbide Corp.), Pluronic/P103, an ethylene oxide/propylene oxide block copolymer (available from BASF), Pluronic/F77, an ethylene oxide/propylene oxide block copolymer (available from BASF), Pluronic 10R5, an ethylene oxide/propylene oxide block copolymer (available from BASF), and Pluronic PE/L101, a block copolymer of ethylene oxide and propylene oxide (available from BASF). The surfactant or surfactant mixture may be present in the binder composition in an amount of from 0–10% by weight of the active solids in the binder composition. Preferably, the surfactant or surfactant mixture is present in an amount of from 4–7% by weight of the active solids.

The binder composition may be formed by dissolving or diluting the individual components, except for the crosslinking agent, at room temperature to form separate premixes. Preferably, water is used as the solvent for each premix. The premixes may then be added together, either individually or at the same time, and agitated to form a homogenous aqueous main mixture. The premixes may be added in any order. The crosslinking agent may then be added to the main mixture in a pure, undiluted form.

If necessary, the pH of the binder composition may be adjusted. For example, when diaminosilane is used as the crosslinking agent in the binder composition, the pH of the main mixture may be adjusted to approximately 6.0–6.5 before adding the crosslinking agent to the main mixture. Any suitable pH adjuster may be added to the binder composition to adjust the pH to a desired level. The pH of the binder composition may fall in the range of from 4–10.

A binder composition according to an exemplary embodiment of the present invention is set forth below in Table 4.

TABLE 4

| Component of Binder Composition | % by Weight of Active Solids |
| --- | --- |
| Maldene 286[a] | 57 |
| Baybond PU-403[b] | 29 |
| Silquest A-1100[c] | 8 |
| Pluronic F-77[d] | 0.7 |
| Pluronic PE-103[e] | 2 |
| Pluronic L-101[f] | 0.7 |
| Triton X-100[g] | 2 |

[a]maleic acid/butadiene copolymer, partial ammonium salt (Lindau Chemicals, Inc.)
[b]polyurethane dispersion (Bayer)
[c]aminopropyltriethoxysilane (GE Silicones-OSI Specialties)
[d]oxirane (EO-PO copolymer) (BASF)
[e]oxirane (EO-PO copolymer) (BASF)
[f]oxirane (EO-PO copolymer) (BASF)
[g]octylphenoxypolyethoxyethanol One advantage of the two-part sizing composition is that the two-part sizing composition imparts improved hydrolysis resistance to reinforced composites. As such, the two-part sizing composition may be used to form thermoplastic composites for use in applications where high resistance to hydrolysis is needed, such as, for example, in an automobile radiator where wet strength of the composite is desirable at elevated temperature and pressure conditions. Thus, the two-part sizing composition may be used to form products such as, but not limited to, water end caps for automobile radiators.

In addition, the two-part sizing composition of the instant invention imparts improved physical properties to composites formed from pellets, such as improved strength under extreme hydrolysis conditions, improved tensile strength, improved tensile elongation at break, and improved Charpy impact strength. The two-part sizing composition also permits better fiber integrity and a reduction in fraying of the fiber pellets during handling.

Further, the two-part sizing composition of the present invention has improved stability over conventional sizing formulations which contain an aminosilane and a polyacid in the same mixture. Mixtures containing both aminosilanes and polyacids may not be stable due to chemical interactions between the two compounds. By placing substantially all of the aminosilane in the size composition and the polyacid in the binder composition, both the size composition and the binder composition have increased shelf lives.

An additional advantage of the two-part sizing composition is that by applying the size composition to the reinforcing fiber material prior to the binder composition, a layer of silane is applied directly and substantially evenly to the reinforcing fiber material prior to the application of a film forming agent. This is different than conventional sizing formulations where the silane and the film forming agent are simultaneously applied to a reinforcing fiber material in a single size formulation. As a result, in conventional sizing formulations, the silane coupling agent may or may not come into contact with the reinforcing fiber material and be applied to the reinforcing fiber material before the film forming agent. Optimal physical properties of the composite product formed from the sized reinforced fiber materials may be achieved due to the interaction of the silane with the surface of the reinforcing fiber material and the formation of a three-dimensional crosslinked structure of silane on the reinforcing fiber material. In addition, the presence of silane on the reinforcing fiber material reduces subsequent corrosion to the reinforcing fiber materials and abrasion of the individual fibers by avoiding fiber-to-fiber contact.

Another advantage of the two-part sizing composition is that by coating the surface of the reinforcing fiber material with the silane coupling agent by adding the size composition before the binder composition, there is a greater chance that the silane will react with the reinforcing fiber material and not the acid functions of the maleic anhydride copolymer. Thus, coating the reinforcing fiber material with a first layer of silane may lead to higher mechanical properties by lowering the sensitivity of the reinforcing fiber material to additives which are known to reduce the mechanical properties of the composite, e.g., calcium stearate. Although not wishing to be bound by theory, it is believed that when polyacids are added at the same time as the coupling agent, the polyacids interact with the glass surface, leading to a bonded glass surface-matrix that is more sensitive to the presence of metal ions in the matrix (such as when calcium stearate is added to a polyamide matrix).

The process for making a densified reinforcing fiber product may be an in-line process that permits the application of the sizing composition, the chopping of the glass fibers, the application of the binder composition, and pelletizing the reinforcing fiber material. Such an in-line process forms a pellet product that exhibits superior physical properties, such as improved strength, when integrated into a composite (e.g., when compared to pellets produced by processes previously known in the art). Although not wishing to be bound by theory, such superior properties are believed to be due to the improved compatibility of the size composition and binder composition, which permits a better coating of the reinforcing fiber material.

The process for making a densified reinforcing fiber product according to the invention may employ an apparatus that includes: (a) an apparatus for applying a size composition to a continuous fiber material; (b) an apparatus for cutting the glass fiber strands to form chopped strand segments; (c) an apparatus for conveying the chopped strand segments to a first tumbling apparatus; (d) an apparatus for applying a binder composition to the chopped strand segments; (e) a first tumbling apparatus for imparting a tumbling action to the chopped strand segments to disperse the binder composition and cause the chopped strand segments to align and coalesce into pellets; (f) optionally, an apparatus for conveying the pellets to a second tumbling apparatus; (g) optionally, a second tumbling apparatus for tumbling the pellets to compact them and increase their density; (h) an apparatus for conveying the densified pellets to a drying apparatus; and (i) a drying apparatus adapted to receive and dry the pellets.

Initially, the size composition may be applied to the reinforcing fiber material by any conventional means, including kiss roll, dip-draw, and slide or spray applicators. Preferably, the precursor size is applied by passing the reinforcing fiber material, e.g., strands of glass or polymer, over a kiss roll applicator. The size composition is preferably applied to the strands in an amount sufficient to provide the strands with a moisture content of from about 8% by weight to about 13% by weight, more preferably about 11% by weight.

The sized strands may then be chopped into strand segments. Preferably, the strand segments have a length of from approximately 3 mm to approximately 50 mm. Any suitable method or apparatus known to those of ordinary skill for chopping glass fiber strands into segments may be used.

Next, the binder composition may be applied to the chopped strand segments. The coated chopped strand segments are then pelletized by any suitable method known to those of ordinary skill in the art, such as, for example, tumbling or otherwise agitating the chopped strand segments in a pelletizer. Processes suitable for pelletizing the chopped strand segments are disclosed in U.S. Pat. Nos. 5,868,982, 5,945,134, 6,365,090, and 6,659,756 to Strait et al., and U.S. Pat. No. 5,693,378 to Hill et al., all of which are incorporated by reference in their entireties. During the pelletizing process, the presence of the crosslinker and the film former in the binder size facilitates adhesion between the strand segments. Further, the amount of moisture in the binder composition serves to adjust the moisture content of the strand segments to a level suitable for the formation of pellets when the strand segments are tumbled in the pelletizer. Although the moisture content of the strand segments can be adjusted prior to their introduction into the pelletizer, it is preferred that the segments are hydrated to a moisture content suitable for pellet formation in the pelletizer itself.

Preferably, the moisture content of the chopped strand segments in the pelletizer is from about 12% by weight to about 16% by weight, and more preferably from about 13% by weight to about 14% by weight, based on the total weight of the binder-sized, chopped strand segments. If the moisture content is too low, the strand segments tend not to combine into pellets and will remain in a strand formation. On the other hand, if the moisture content is too high, the strands tend to agglomerate or clump or form pellets having a large diameter and an irregular, non-cylindrical shape.

The binder composition may be applied to the chopped strand segments as they enter the pelletizer, or after the chopped segments are placed in the pelletizer but prior to tumbling. In an alternative embodiment, the binder composition may be sprayed onto the strands before they are chopped. In this alternative embodiment, it is preferable to use a pelletizer that is specially equipped with tumbling means such as baffles to ensure adequate tumbling and formation of the pellets.

To ensure good coverage of the chopped segments, the binder composition is preferably applied to the chopped strand segments as they enter the pelletizer but before they begin to coalesce into pellets. If the binder composition is applied at other locations within the pelletizer, pellets may form before the strand segments are completely coated with the binder composition, which results in pellets containing fibers that are not coated with the binder composition. When such pellets are used in the manufacture of fiber reinforced composite articles, the uncoated fibers lack the interfacial coating required to provide good reinforcing characteristics, and the resulting composite article will have less than optimal properties. Preferably, the pelletizer is equipped with a spray nozzle, located adjacent to the strand segment inlet, for spraying the binder size onto the strand segments as they enter the pelletizer.

The pelletizer may be any apparatus capable of tumbling the strand segments in such a way that: (1) they become substantially uniformly coated with the binder composition, and (2) multiple chopped strand segments align and coalesce into pellets having a desired dimension. Such a tumbling apparatus should have an average residence time sufficient to insure that the strand segments become substantially coated with the binder size and form pellets, but insufficient for the pellets to be damaged or degraded through abrasion (e.g., by rubbing against one another). Preferably, the residence time in the tumbling apparatus is from about 1 minute to about 10 minutes. More preferably, the residence time in the tumbling apparatus is from about 1 minute to about 3 minutes.

A preferred pelletizer is a rotating drum, such as that disclosed in U.S. Pat. No. 5,868,982, as referenced herein above. U.S. Pat. No. 5,868,982 discloses an apparatus for making reinforcing fiber pellets, which is preferably provided with a system for monitoring and/or adjusting various process parameters. The moisture content of the strand segment input may be monitored and controlled using suitable method. In one embodiment in which the binder composition is applied to the strand segments before they are placed in the pelletizer, the rotating drum is adapted to accommodate a spray head for applying the binder composition to the strand segments as they enter the drum. The binder composition and a solvent, such as water, may be combined into one fluid stream and dispersed through the nozzle orifice. This stream may be combined with two jets of air positioned approximately 180 degrees apart and at an angle of 60 degrees to the direction of the stream flow. Mixing the binder composition with the forced air streams effectively creates a mist that is propelled onto the surface of the tumbling strand segments in the drum.

Rotation of the drum causes the wet strand segments to tumble around one another while the surface tension created by the wet sizing or coating causes strand segments contacting one another over a substantial portion of their length to align with one another and coalesce into a cylindrically shaped pellet. By such action, any fines or single fibers created during the chopping operation are recombined with and incorporated into the forming pellets to essentially eliminate individual fine fibers from the resulting pellets. Preferably, the drum is tilted slightly so that the end of the drum from which the pellets exit is lower than the end in which they enter to ensure that the pellets formed in the drum do not remain in the drum for an excessive period of time.

The size of the pellets formed in the drum is controlled primarily by the moisture content of the strand segments. If the moisture content is maintained at a high level, a greater number of strand segments will coalesce into a pellet and the pellet will have a larger diameter. On the other hand, if the moisture is maintained at a lower level, fewer strand segments will coalesce into a pellet and the pellet will have a smaller diameter. The amount of binder composition that is discharged onto the strands may be controlled by a computer which monitors the weight of wet glass entering the pelletizer and adjusts the amount of the binder composition to obtain a final chopped strand having a strand solids content of from about 0.2% to about 2.0% by weight.

Preferably the pellets formed have a diameter of from about 20% to about 65% of their length. Such pellets are typically formed by combining from about 70 strand segments to about 175 strand segments, each containing from about 500 individual filaments per strand to about 8000 individual filaments per strand.

The size of the pellets may also be affected by drum throughput. For example, the higher the drum throughput, the shorter the residence time of the strand segments in the drum. As a result, smaller pellets may be formed because the binder composition is not adequately dispersed on the strands which may cause the strands not to coalesce into a pellet. In addition, pellets that are formed in the drum for a shorter period of time are less compacted than those pellets that formed in the drum for a longer period of time.

Although some compaction of the formed pellets invariably occurs in the pelletizer, it is typically insufficient to increase the pellet density to a level providing optimum flowability. For this reason, after their formation in the pelletizer, the pellets may optionally be fed into a second tumbling apparatus or densifier, wherein the pellets are further compacted and densified. Any low-impact tumbling apparatus that will compact the pellets without degrading them through abrasion or otherwise damaging the pellets may be used. Preferably, the densifier is a zig-zag tube adapted to be rotated about its longitudinal axis, such as is described in U.S. Pat. Nos. 5,868,982, 5,945,134, 6,365,090, and 6,659,756 to Strait et al.

Preferably, the densifier has a gentler, less vigorous tumbling action than that of the pelletizer to minimize degradation of the pellets. As the zig-zag tube is rotated, pellets placed therein are gently tumbled about by the tube's rotation as they are pulled through the tube by gravity. As with the rotating drum described above, the zig-zag tube densifier is preferably tilted at a slight angle to ensure that the pellets flow through the apparatus without excessive residence times. Furthermore, the densifier preferably has an average residence time of less than approximately 5 minutes to reduce any abrasion that may occur. Preferably, the average residence time in the densifier is from about 1 minute to about 2 minutes.

Although pellet formation and densification may occur in separate apparatuses, such as a separate rotary drum and a rotating zig-zag tube linked by a conveyor, the pelletizing process may be accomplished using any suitable apparatus. For example, pellet formation and densification may occur in separate tumbling regions or zones within a single apparatus. A preferred example of such an apparatus is a "Zig-Zag" blender commercially available from Patterson Kelly. In a preferred embodiment of this device, a drum is equipped with an interior baffle to reduce the free-fall distance of the glass pellets and strand segments during rotation of the drum. By reducing this distance, less deterioration of the glass fibers and pellets through impact and abrasion occurs, resulting in improved physical properties in the glass fiber reinforced molded articles manufactured therefrom.

Although the baffles may be of any form, cylindrical and curved plate baffles are most preferred. Inclusion of the baffles in the drum of the pelletizer has been found to reduce the average residence time of the pellets in the drum from about 2 minutes and 35 seconds without a baffle, to about 1 minute and 40 seconds for the generally cylindrical baffle and 1 minute and 20 seconds for the curved plate baffle. In addition, the apparent reduction in fiber degradation resulting from the inclusion of such baffles is evident from an increase in the physical properties of articles molded from the resulting pellets, including average increases in tensile strength of from about 2 to about 3%, increases in flexural strength of from about 1 to about 2%, and increases in impact strength of from about 4 to about 5%.

After densification, the pellets may be delivered onto a conveyor belt and dried, e.g., using a hooded oven supplied with hot air and cooling air or any other suitable drying apparatus easily identified by one of skill in the art. In order to reduce drying time to a level acceptable for commercial mass production, it is preferred that the fibers are dried at elevated temperatures of from about 250° F. (121.1° C.) to about 560° F. (293.3° C.) in a fluidized-bed oven. After drying, the densified pellets may be classified by size using a screen or other suitable device.

By varying the throughput and moisture content of the strand segments, glass fiber pellets can be made that are from about 13% to about 60% denser than the corresponding unpelleted strand segments, and from about 10 times to about 65 times larger in diameter. For example, chopped 4-mm (length) segments of a 2000-filament strand composed of 14-micron (diameter) fibers typically have a bulk density of from about 33 lb/ft$^3$ (528.66 kg/m$^3$) to 36 lb/ft$^3$ (576.72 kg/m$^3$). After being hydrated to a moisture content of from about 13% to about 14% and formed into densified pellets such as is described above, according to the process of the invention, the resulting dried pellets typically have a bulk density of from about 40 lb/ft$^3$ (640.8 kg/m$^3$) to about 55 lb/ft$^3$ (881.1 kg/m$^3$). As a result of their increased diameter-to-length ratio and increased density, the resulting pellets exhibit significantly improved flowability in comparison to the unpelleted chopped strand product.

The size composition and the binder composition facilitate treating reinforcing fiber materials, e.g., glass, during a continuous process that includes forming the fibers as well as subsequent processing or handling. By applying the binder composition in the pelletizer, an application efficiency of 95–100% for the binder composition may be obtained. This high application efficiency reduces waste water contamination in the plant. Further, because the binder composition can be applied efficiently, the binder composition may be applied with a reduction in cost.

In addition, by applying the binder composition separately from the sizing composition outside the fiber-forming environment permits, materials that are not desirably applied during the fiber-forming process because of toxicity, safety, flammability, irritation, stability, low compatibility with aminosilanes, viscosity, toxicity, cleanliness, odor, cost, or shear sensitivity may be applied to the glass fibers. Also, because the polyacid in the binder composition can be applied to the glass fibers in a more concentrated form in the pelletizer than if it were applied directly to the glass strands as they are being formed, there is reduced fiber logging and waste as compared to conventional in-line processes.

Although the invention is highly suitable for in-line manufacturing processes, such as described above, it may also be used in an off-line process in which the size composition and the binder composition are applied to previously formed and packaged reinforcing fiber materials, or in which the size composition and the binder composition are applied to the reinforcing fiber material at different times. For example, the size composition may be applied to a formed fiber strand, after which the strand may be wound and stored before subsequent unwinding, chopping into segments and application of the binder composition.

Having generally described this invention, a further understanding can be obtained by reference to certain specific examples illustrated below which are provided for purposes of illustration only and are not intended to be all inclusive or limiting unless otherwise specified.

EXAMPLE

Inventive Two-Part Sizing Composition

The size composition as set forth in Table 5 was prepared and applied to Advantex® glass fibers as they were produced in a continuous in-line process. In particular, after forming 10.1 micron Advantex® glass fibers, the aqueous size composition was applied with a conventional kiss roll type applicator turning in the direction of the strand at 15 meters per minute. Throughput of the molten glass fed through the bushing was approximately 215 lbs/hour. The size composition was applied to achieve a strand Loss-On-Ignition (LOI) of 0.06% solid on the glass fibers. A conventional loss on ignition (LOI) method, ASTM 2854, was used to determine how much of the applied chemical treatment was on the glass fibers. The glass fibers were then collected into a strand and chopped in-line by a chopper into segments of approximately 4.5 mm in length.

TABLE 5

Size Composition

| Component | % by Weight of Active Solids |
| --- | --- |
| A-1100[a] | 91 |
| Lubesize K-12[b] | 6 |
| Zonyl FS-300[c] | 2 |

[a]aminopropyltriethoxysilane (GE Silicone OSI)
[b]tetraethylene pentamine r. with stearic acid (AOC)
[c]fluoroalkyl alcohol substituted polyethylene glycol (Dupont)

The chopped segments were then conveyed to a pelletizer where the inventive binder according to Table 6 was sprayed onto the chopped segments as they passed through the entrance chamber of the pelletizer. The binder composition was applied to achieve a strand LOI of 0.43% solid on the glass fibers. The total Loss-On-Ignition (LOI) of the glass was 0.49%. The densified glass pellets were then conveyed to a fluidized bed oven and dried to a moisture content of less than or equal to approximately 0.05%.

TABLE 6

Binder Composition

| Component | % by Weight of Active Solids |
| --- | --- |
| Maldene 286[a] | 57 |
| Baybond ® PU-403[b] | 30 |
| A-1100[c] | 7 |
| Pluronic F-77[d] | 0.7 |
| Pluronic PE-103[e] | 2 |
| Pluronic L-101[f] | 0.8 |
| Triton X-100[g] | 2 |

[a]maleic acid/butadiene copolymer, partial ammonium salt (Lindau Chemicals, Inc.)
[b]polyurethane dispersion (Bayer)
[c]aminopropyltriethoxysilane (GE Silicones-OSI Specialties)
[d]oxirane (EO-PO copolymer) (BASF)
[e]oxirane (EO-PO copolymer) (BASF)
[f]oxirane (EO-PO copolymer) (BASF)
[g]octylphenoxypolyethoxyethanol (Union Carbide Corp)

Comparative Two-Part Sizing Composition

A size composition as set forth in Table 7 was applied to Advantex® glass fibers as they were produced in a continuous in-line process. The glass fibers were then formed into strands and chopped into strand segments having a length of approximately 4.5 mm. The molten glass was fed through the bushing at approximately 215 lbs/hour. The size composition was applied with a conventional kiss roll type applicator turning in the direction of the strand at 15 meters per minute. The size composition was applied at a concentration of 0.69% to achieve a strand LOI of 0.06% solid on the glass.

TABLE 7

Comparative Size Composition

| Component | % by Weight of Active Solids |
|---|---|
| A-1100[a] | 51 |
| Lubesize K-12[b] | 40 |
| Zonyl FS-300[c] | 9 |

[a]aminopropyltriethoxysilane (GE Silicone OSI)
[b]tetraethylene pentamine r. with stearic acid (AOC)
[c]fluoroalkyl alcohol substituted polyethylene glycol (Dupont)

The chopped segments were then conveyed to a pelletizer where the binder composition according to Table 8 was sprayed onto the chopped segments. The binder composition was applied to achieve a strand LOI of 0.59% solid on the glass fibers. The total Loss-On-Ignition (LOI) of the glass was 0.65%.

TABLE 8

Comparative Binder Composition

| Component | % by Weight of Active Solids |
|---|---|
| EMA co-polymer[a] | 40 |
| Jeffamine ® ED-2003[b] | 14 |
| Glascol C95[c] | 7 |
| A-1100[d] | 7 |
| Aquathane ® 518[e] | 31 |

[a]alternated copolymer of maleic anhydride and ethylene (Zeeland Chemicals)
[b]water-soluble aliphatic diamine derived from a propylene oxide-capped poly(ethylene oxide) (Huntsman Corp.)
[c]acrylic copolymer (Ciba)
[d]aminopropyltriethoxysilane (GE Silicone OSI)
[e]polyurethane dispersion (D.I.C.)

Comparative Testing

The glass fiber pellets and the comparative pellets were then separately compounded with molding pellets of polyamide 66 using a twin screw co-rotating intermeshing extruder (ZSK30 Werner-Pfleiderer (Coperion)) while feeding the pellets in the melt of the second port of the extruder. The fiber/resin mixture was then degassed and formed into compounded glass/resin pellets.

Next, the compounded glass/resin pellets were dried for 12 hours at 95° C. with a molecular sieve circulating hot air dryer. After drying, the pellets were injection molded with an injection molding machine (Demag DC80) into Axxicon ISO molds to form standardized composite specimens. The molded specimens were placed in metallic vessels containing silicagel to keep them dry.

The composite specimens were cross-mixed between different autoclaves to simulate the same aging for both composite specimens. During testing, the aged composites were fully immersed in an ethylene glycol/water mixture and placed under the pressure and temperature conditions described in Tables 10–12. When each of the hydrolysis tests described in Tables 10–12 were completed, the vessel was cooled to room temperature before the tensile strength, the tensile elongation, and the Charpy un-notched impact strength were determined.

Tests to determine tensile strength and tensile elongation at break were conducted according to the procedures set forth in ISO 527-4/1B/10. The Charpy un-notched impact strength was measured according to the procedures set forth in ISO 179-1efU. The lab conditions were set as described in ISO 291.

The results of the comparative testing is set forth in Tables 9–12.

TABLE 9

| Dry as Molded Properties | Comparative Composite | Composite Sized with Two-Part Sizing Composition |
|---|---|---|
| Tensile Strength (MPa) | 196.08 | 195.48 |
| Tensile Elongation to Break (%) | 3.9 | 4.0 |
| Charpy Un-notched (KJ/m$^2$) | 84.73 | 87.73 |

TABLE 10

| Hydrolyze 500 hours Ethylene Glycol/Water (50/50) at 120° C. | Comparative Composite | Composite Sized with Two-Part Sizing Composition |
|---|---|---|
| Tensile Strength (MPa) | 87.80 | 91.57 |
| Tensile Elongation to Break (%) | 4.49 | 4.87 |
| Charpy Un-notched (KJ/m$^2$) | 90.41 | 94.21 |

TABLE 11

| Hydrolyze 150 hours 50% Ethylene Glycol/Water (50/50) at 135° C. | Comparative Composite | Composite Sized with Two-Part Sizing Composition |
|---|---|---|
| Tensile Strength (MPa) | 83.2 | 85.4 |
| Tensile Elongation to Break (%) | 4.69 | 4.69 |
| Charpy Un-notched (KJ/m$^2$) | 70.51 | 75.28 |

TABLE 12

| Industrial Repeat: Hydrolyze 150 hours 50% Ethylene Glycol/Water (50/50) at 135° C. | Comparative Composite | Composite Sized with Two-Part Sizing Composition |
|---|---|---|
| Tensile Strength (MPa) | 81.6 | 78.9 |
| Charpy Un-notched (KJ/m$^2$) | 63.0 | 68.7 |

It can be seen from the data obtained and illustrated in the above tables that the two-part sizing composition of the present invention imparts improved physical properties to composites formed from glass fibers sized with the two-part sizing composition under extreme hydrolysis conditions. As shown above in Table 8, the composite product formed with fibers sized with the inventive two-part sizing composition demonstrated improved tensile strength, improved tensile elongation at break, and improved Charpy un-notched impact strength under extreme hydrolysis conditions for 500 hours. At 150 hours of extreme hydrolysis conditions, the composite product formed with fibers sized with the inventive two-part sizing composition demonstrated results equal to or better than the comparative composite product, as shown in Table 9. In Table 10, it can be seen that even under an industrial repeat, the Charpy un-notched impact strength of the composite formed with the two-part sizing composition was improved over the comparative composite. Such an improvement in the Charpy un-notched impact strength in each of the extreme hydrolysis tests conducted demonstrates that composites formed from strands sized with the two-part sizing composition may be effectively used in situations where the composite product is subjected to demanding applications requiring high impact strength. In addition, the results demonstrate that composites formed from fibers sized with the two-part sizing composition can be utilized in situations where there is extreme hydrolysis.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A two-part sizing composition for sizing a reinforcing fiber material comprising:
   a size composition; and
   a binder composition including a copolymer formed from maleic anhydride and butadiene or a derivative of said copolymer, said derivative being selected from the group consisting of an anhydride derivative, an acid derivative, a half-ester derivative and a half-amide derivative.

2. The two-part sizing composition according to claim 1, wherein said binder composition further includes at least one other copolymer formed from maleic anhydride and at least one other monomer copolymerized therewith selected from the group consisting of ethylene, propylene, (iso)butylene, methyl vinyl ether and derivatives thereof.

3. The two-part sizing composition according to claim 1, wherein said size composition comprises one or more coupling agents.

4. The two-part sizing composition according to claim 3, wherein said size composition further comprises at least one member selected from the group consisting of a lubricant and a wetting agent.

5. The two-part sizing composition according to claim 4, wherein said binder composition further includes one or more members selected from the group consisting of a film forming agent, a crosslinking agent and at least one surfactant.

6. The two-part sizing composition according to claim 3, wherein said size composition further comprises one or more additives selected from the group consisting of pH adjusters, antioxidants, antifoaming agents, antistatic agents and non-ionic surfactants.

7. The two-part sizing composition according to claim 1, wherein said binder composition further includes at least one member selected from the group consisting of a film forming agent, a crosslinking agent and at least one surfactant.

8. The two-part sizing composition according to claim 7, wherein said binder composition further includes at least one member selected from the group consisting of lubricants and antistatic agents.

9. The two-part sizing composition according to claim 1, wherein said reinforcing fiber material is selected from the group consisting of A-type glass, C-type glass, E-type glass, S-type glass and derivatives thereof.

10. The two part sizing composition according to claim 1, wherein said copolymer includes ethylene-ethylacrylate.

11. A two-part sizing composition for sizing a reinforcing fiber material comprising:
    a size composition; and
    a binder composition including a copolymer formed from maleic anhydride and ethylene-ethylacrylate or a derivative of said copolymer.

12. The two-part sizing composition according to claim 11, wherein said binder composition further includes at least one other copolymer formed from maleic anhydride and at least one other monomer copolymerized therewith selected from the group consisting of ethylene, propylene, (iso)butylene, methyl vinyl ether and derivatives thereof.

13. A reinforcing fiber product comprising one or more strands of a reinforcing fiber material coated first with a size composition and then with a binder composition that includes a copolymer formed from maleic anhydride and butadiene or a derivative of said copolymer, said derivative being selected from the group consisting of an anhydride derivative, an acid derivative, a half-ester derivative and a half-amide derivative.

14. The reinforcing fiber product of claim 13, wherein said size composition comprises one or more coupling agents.

15. The reinforcing fiber product of claim 14, wherein said size composition further comprises at least one member selected from the group consisting of at least one lubricant and at least one wetting agent.

16. The reinforcing fiber product of claim 13, wherein said binder composition further includes at least one member selected from the group consisting of a film forming agent, a crosslinking agent and at least one surfactant.

17. The reinforcing fiber product of claim 13, wherein said reinforcing fiber material is selected from the group consisting of A-type glass, C-type glass, E-type glass, S-type glass and derivatives thereof.

18. The reinforcing fiber product of claim 13, wherein said reinforcing fiber product is in the form of a densified pellet.

19. A reinforcing fiber product comprising one or more strands of a reinforcing fiber material coated first with a size composition and then with a binder composition that includes a copolymer formed from maleic anhydride and ethylene-ethylacrylate or a derivative of said copolymer.

20. The reinforcing fiber product according to claim 19, wherein said binder composition further includes at least one other copolymer formed from maleic anhydride and at least one other monomer copolymerized therewith selected from the group consisting of ethylene, propylene, (iso)butylene, methyl vinyl ether and derivatives thereof.

* * * * *